US011599526B2

(12) United States Patent
Thummala Abbigari et al.

(10) Patent No.: US 11,599,526 B2
(45) Date of Patent: Mar. 7, 2023

(54) SELECTIVELY PUBLISHING AN EVENT RESPONSIVE TO AN OPERATION ON A DATABASE IN A TRANSACTION WHICH IS ROLLED BACK OR COMMITTED

(71) Applicant: salesforce.com, inc., San Francisco, CA (US)

(72) Inventors: Sivananda Reddy Thummala Abbigari, Castro Valley, CA (US); Lawrence Eugenio McAlpin, Bloomington, IN (US); Vikram Kommaraju, Dublin, CA (US); John Arlan Brock, Oakland, CA (US); Soumen Bandyopadhyay, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 197 days.

(21) Appl. No.: 16/671,151

(22) Filed: Oct. 31, 2019

(65) Prior Publication Data
US 2021/0133180 A1 May 6, 2021

(51) Int. Cl.
G06F 16/23 (2019.01)
(52) U.S. Cl.
CPC .................. G06F 16/2379 (2019.01)
(58) Field of Classification Search
CPC .......................... G06F 16/2379; G06F 16/2358
See application file for complete search history.

(56) References Cited

U.S. PATENT DOCUMENTS 7,409,310 B1 * 8/2008 Wade .................. G06F 11/3058
707/999.2
7,730,478 B2 6/2010 Weissman
(Continued)

FOREIGN PATENT DOCUMENTS

EP 3229151 A1 10/2017
WO 2018/097975 A1 5/2018

OTHER PUBLICATIONS

"Kafka 1.1 Documentation," 2017, 390 pages, Apache Kafka, Downloaded from https://kafka.apache.org/11/documentation.html on Oct. 31, 2019.
(Continued)

Primary Examiner — Pierre M Vital
Assistant Examiner — Vy H Ho
(74) Attorney, Agent, or Firm — Nicholson De Vos Webster & Elliott LLP

(57) ABSTRACT

Implementations are described for selectively publishing an event responsive to an operation on a database in a transaction. Publishing the event is delayed or not delayed respectively, responsive to determining that a value of an attribute for the event indicates that publishing the event is to be delayed, or not to be delayed, until the transaction is rolled back or committed. If publishing the event is delayed, the event is published if the transaction is committed and discarded if the transaction is rolled back. If publishing the event is not delayed, the event is published. Optionally, if the event is published, the event is published in a database or a datastore respectively, responsive to determining whether another value of another attribute for the event indicates that the event is to be published in a database or a datastore.

20 Claims, 6 Drawing Sheets

(56) References Cited

U.S. PATENT DOCUMENTS

| | | | |
|---|---|---|---|
| 7,774,790 B1* | 8/2010 | Jirman | G06F 11/3476 |
| | | | 719/318 |
| 9,319,267 B1* | 4/2016 | Buchko | H04L 41/0663 |
| 9,417,840 B2 | 8/2016 | Pradeep et al. | |
| 9,626,254 B2* | 4/2017 | Misra | G06F 11/1448 |
| 9,710,127 B2 | 7/2017 | Torman | |
| 9,729,556 B2 | 8/2017 | Brock | |
| 9,767,022 B2 | 9/2017 | Pradeep | |
| 9,774,603 B2 | 9/2017 | Brock | |
| 10,178,156 B2 | 1/2019 | Pradeep et al. | |
| 10,275,281 B2 | 4/2019 | Pradeep et al. | |
| 10,298,582 B2 | 5/2019 | Syomichev et al. | |
| 10,332,129 B2 | 6/2019 | Torman et al. | |
| 10,339,126 B2 | 7/2019 | Pradeep et al. | |
| 10,394,412 B2 | 8/2019 | Torman et al. | |
| 10,536,463 B2 | 1/2020 | Syomichev et al. | |
| 10,592,474 B2 | 3/2020 | Torman et al. | |
| 11,080,148 B2* | 8/2021 | Natanzon | G06F 11/1451 |
| 11,086,902 B2* | 8/2021 | McGee | G06F 16/275 |
| 2012/0047539 A1* | 2/2012 | Hao | H04N 21/482 |
| | | | 725/115 |
| 2015/0106736 A1 | 4/2015 | Torman et al. | |
| 2015/0127670 A1 | 5/2015 | Torman et al. | |
| 2015/0302037 A1* | 10/2015 | Jackson | G06F 16/972 |
| | | | 707/736 |
| 2016/0063270 A1 | 3/2016 | Brock | |
| 2016/0070589 A1* | 3/2016 | Vermeulen | G06F 9/466 |
| | | | 711/153 |
| 2016/0077798 A1 | 3/2016 | Pradeep | |
| 2016/0080461 A1 | 3/2016 | Pradeep et al. | |
| 2017/0060741 A1 | 3/2017 | Pradeep et al. | |
| 2017/0075922 A1 | 3/2017 | Torman | |
| 2017/0293632 A1 | 10/2017 | Pradeep et al. | |
| 2017/0364571 A1* | 12/2017 | Lu | G06F 16/2358 |
| 2018/0025113 A1 | 1/2018 | Torman et al. | |
| 2018/0129694 A1* | 5/2018 | Hoffner | G06F 16/2358 |
| 2018/0146034 A1 | 5/2018 | Lintner et al. | |
| 2018/0254841 A1* | 9/2018 | Nannra | H04L 69/28 |
| 2019/0095448 A1* | 3/2019 | Kvalnes | G06F 16/2255 |
| 2020/0027126 A1 | 1/2020 | Zhao et al. | |
| 2020/0097373 A1 | 3/2020 | Zhao et al. | |
| 2020/0099752 A1 | 3/2020 | Naidu et al. | |
| 2021/0089556 A1* | 3/2021 | Chainani | G06F 16/273 |

OTHER PUBLICATIONS

"Kafka 2.0 Documentation," 2017, 444 pages, Apache Kafka, Downloaded from https://kafka.apache.org/20/documentation.html on Oct. 31, 2019.

"Kafka 2.1 Documentation," 2017, 458 pages, Apache Kafka, Downloaded from https://kafka.apache.org/21/documentation.html on Oct. 30, 2019.

"Kafka 2.2 Documentation," 2017, 481 pages, Apache Kafka, Downloaded from https://kafka.apache.org/22/documentation.html on Oct. 30, 2019.

JBoss Chapter 11 Events, 9 pages, Weld 3.1.2.Final—CDI Reference Implementation, Downloaded from https://docs.jboss.org/weld/reference/latest/en-US/html/events.html#_transactional_observers on Sep. 26, 2019.

* cited by examiner

SELECTIVELY PUBLISHING AN EVENT RESPONSIVE TO AN OPERATION ON A DATABASE IN A TRANSACTION WHICH IS ROLLED BACK OR COMMITTED

TECHNICAL FIELD

One or more implementations relate to the field of event publishing; and more specifically, to publishing an event responsive to an operation on a database.

BACKGROUND ART

A transaction is a unit of work performed on a database. For example, a transaction may include one or more insertions, updates, and/or deletions of one or more records in a database. A transaction can be rolled back or committed. Rolling back a transaction on a database means returning the database to its state before the transaction was started; e.g., when a transaction includes inserting a record in a database, rolling back the transaction includes removing the record, if inserted, from the database. In contrast, committing a transaction means completing the unit of work on the database; e.g., when a transaction includes inserting, updating, and/or deleting one more records in a database, committing the transaction includes performing the inserting, updating, and/or deleting the records.

An event is an identifiable unit of data that conveys information about an occurrence or lack of occurrence in a computing system. Events can relate to operations that occur in a database system. For example, an event may convey that a record of a database has been updated, deleted, or inserted. Typically, an event includes one or more attributes. In some tools, an event is associated with a topic to which one or more consumers are subscribed; e.g., in a publish-subscribe messaging system.

Some tools can publish an event responsive to an operation on a database in a transaction. Publishing an event makes the event available to one or more potential consumers. An event can be made available to the consumers by adding the event to a source of events; e.g., a datastore or database. A datastore is typically intended to store data (which may be voluminous) for possible consumption by multiple clients. Datastores include those which typically persist data (e.g., an on-disk database) and those which typically do not persist data (e.g., an in-memory database, a streaming platform, a key-value datastore, a document store, etc.). In existing systems, when an event is published responsive to an operation on a database in a transaction, the event is made available to the consumers regardless of whether the transaction is committed or rolled back. Thus, when the transaction is rolled back, the published event reflects an operation on the database that was not performed.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1A:
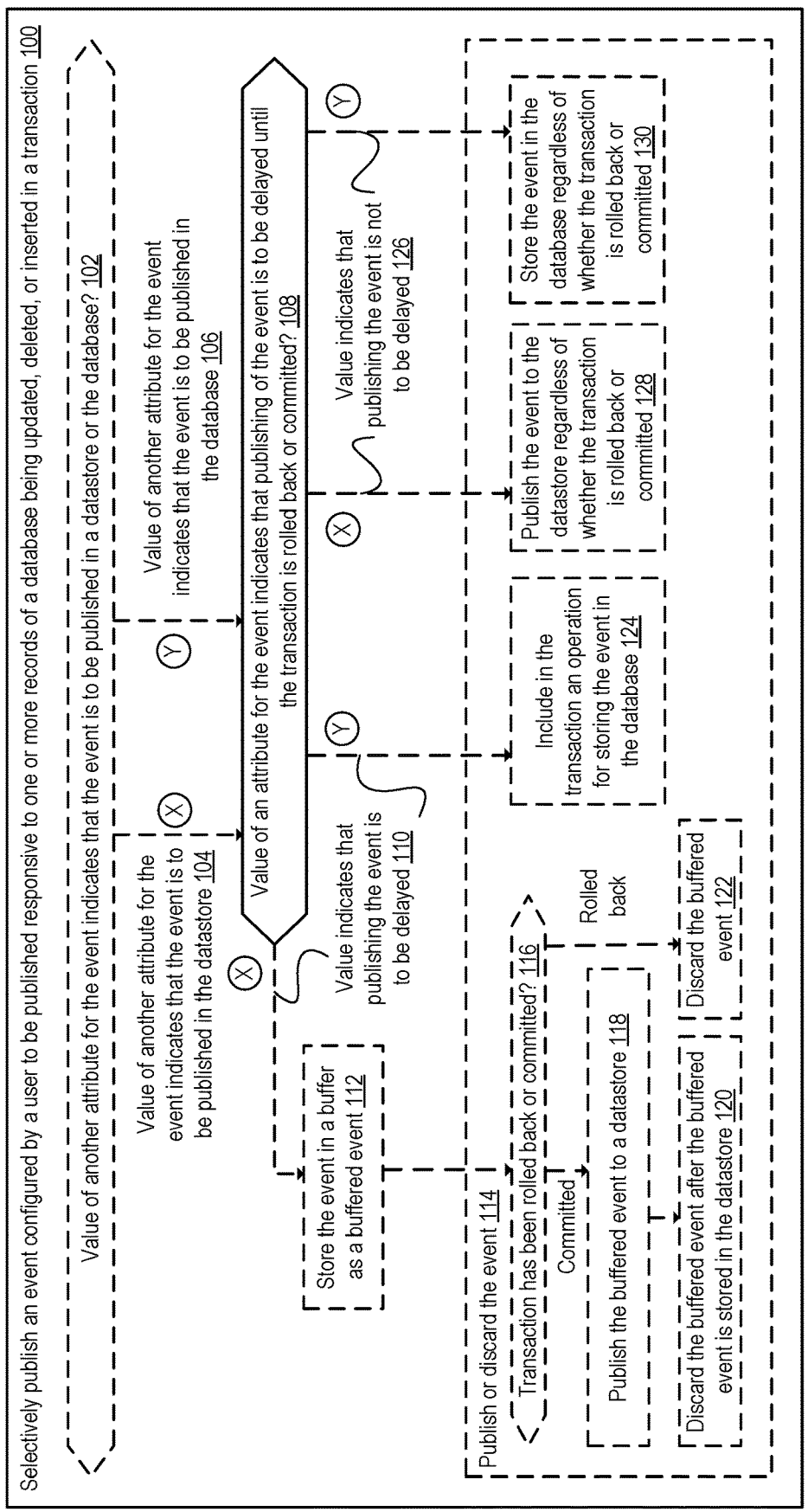
FIG. 1A is a flow diagram showing operations for selectively publishing an event configured by a user to be published responsive to one or more records of a database being updated, deleted, or inserted in a transaction, according to some example implementations.

The following description describes implementations for selectively publishing an event configured by a user to be published responsive to an operation being performed on a database in a transaction. Implementations are described that involve one or more records of a database being updated, deleted, or inserted. However, one of skill in the art will recognize that selectively publishing an event published responsive to other kinds of transactions are within the spirit and scope of the invention. For example, implementations described herein support selectively publishing an event configured by a user to be published responsive to 1) creating, altering, or dropping a database object in a transaction (e.g., a transaction involving data definition language commands in Structured Query Language (SQL)); and/or 2) granting or revoking access privileges to a database object in a transaction (e.g., a transaction involving data control language statements in SQL), etc.

Moreover, implementations described herein are not limited to relational database management systems (RDBMSs). Rather, implementations support selectively publishing an event configured by a user to be published responsive to an operation on any store of data that supports a transaction which may not be committed (e.g., which may be rolled back, which may not achieve data consistency in a timely manner, etc.).

Implementations are not limited to any particular event-driven computing architecture. For example, an event described herein (which may also be referred to as a message) may be implemented as a message in a publish-subscribe messaging system which may include one or more different kinds of filtering (e.g., topic-based filtering, content-based filtering, role-based filtering, etc.). Thus, in some implementations, an event may be associated with a topic and publishing an event (e.g., to a datastore) causes the event to be transmitted to one or more consumers (i.e., sent such that the consumers are expected to receive the event) that have subscribed to the topic. However, this is exemplary and not limiting. In other implementations, message queueing may be used and thus publishing an event includes publishing the event to a message queue read by one or more consumers; alternatively, an event may be broadcast to a channel and read by one or more consumers that have connected to that channel, etc. Generally, a consumer consumes events (e.g., after subscribing to receive events in a publish-subscribe messaging system, after registering to receive events from a message queue, etc.). In some implementations, the consumer can be used for gaining insight on the data included in an event, for gaining insight on the operations and actions performed in an application and/or electronic device, and/or for gaining insight on the operations of a database system (e.g., database server 144). In some implementations, a consumer may be implemented in a distributed environment, where multiple event consumers can be implemented on one or more electronic devices.

FIG. 1A is a flow diagram showing operations for selectively publishing an event configured by a user to be published responsive to one or more records of a database being updated, deleted, or inserted in a transaction, according to some example implementations. In some implementations, selectively publishing an event means publishing the event in a selected way. In some implementations, the selective publishing of an event may include delaying the publishing of the event such that the event is made available to one or more consumers after a delay. In other implementations, the selective publishing of an event may include making the event available to one or more consumers without delay. In alternative implementations, the selective publishing of an event may include delaying the publishing and then not publishing the event, etc.

Implementations described herein provide an advantage because they allow for selectively publishing an event rather than always publishing an event regardless of whether a transaction is rolled back or committed. For example, publishing an event 1) may or may not be delayed until the transaction is rolled back or committed; and/or 2) an event may be published to a datastore or in the database.

Implementations described herein also provide an advantage because they provide for selectively publishing an event in a configurable way. For example, a user may configure an event 1) with an attribute that indicates that publishing the event is to be delayed (or not); and/or 2) with another attribute that indicates that the event is to be published in a datastore or in a database. An attribute (which may also be referred to as a field) of an event is a part of an event that contains one or more values (e.g., an attribute may contain a value that indicates that the publishing of the event is to be delayed until a transaction is rolled back or committed). "Configured" means to be adapted for a particular purpose, and "configurable" means able to be configured. Thus, implementations allow not only for a user to configure an event, but also for a configurable and therefore more flexible system which can, for example, publish an event selectively based on one or more attributes of the event.

Block 100 includes selectively publishing an event configured by a user to be published responsive to one or more records of a database being updated, deleted, or inserted in a transaction. Block 100 includes block 108 and optional blocks 102, 112, and 114. Block 102 includes determining whether a value of another attribute for the event indicates that the event is to be published in the datastore or the database. Thus, implementations allow for publishing an event in a choice of source of events, thus providing flexibility. In some implementations, one or more values of the another attribute for the event may indicate that the event is to be published in one or more sources of events; in such implementations, block 114 (and optionally, block 112) may be executed one or more times responsive to executing block 102 one or more times. Additionally or alternatively, the sources of events may include more than a datastore and a database (e.g., computer-readable storage or transmission media).

Responsive to determining that the value of another attribute for the event indicates that the event is to be published in the datastore 104, flow passes to block 108. Block 108 includes determining whether a value of an attribute for the event indicates that publishing of the event is to be delayed until the transaction is rolled back or committed. In one sense, delaying publication of the event until the transaction is rolled back or committed and then respectively discarding or publishing the event expands the boundary of the transaction such that the transaction includes the publication of the event; i.e., the event is published if the transaction is committed, and the event is not published if the transaction is rolled back. Expanding the transaction boundary in this way avoids an event being published which reflects an operation on the database that was not performed (i.e., because the transaction including the operation was rolled back). Thus, expanding the transaction boundary makes an event available to one or more consumers when the transaction is committed and avoids making the event available to the consumers when a transaction is rolled back, i.e., when the operation on the database is not performed. This avoids undesirable effects such as one or more consumers of the event acting on an event responsive to its receipt when the operation corresponding to the event was not performed in the database (e.g., when the transaction including the operation was rolled back).

FIG. 1A shows implementations in which flow passes from block 102 to block 108, but this flow is exemplary. In these implementations the determination of whether a value of the another attribute for the event indicates that the event is to be published in a datastore or a database is performed before the determination of whether a value of an attribute for the event indicates that the publishing of the event is to be delayed until the transaction is rolled back or committed. In other implementations (not shown in FIG. 1A), flow may pass from block 108 to block 102, and then from block 102 to one or more of blocks 112, and 114. In these other implementations, the determination of whether a value of an attribute for the event indicates that the publishing of the event is to be delayed until the transaction is rolled back or committed is performed before the determination of whether a value of the another attribute for the event indicates that the event is to be published in a datastore or a database. In other words, the order of performing the operations 102 and 108 can be different than the implementations described with respect to FIG. 1A.

Responsive to determining that the value indicates that publishing the event is to be delayed 110, flow passes from block 108 to either block 112 (designated by circled reference "X") or block 124 (designated by circled reference "Y"). Circled reference "X" is used in FIG. 1A to indicate a flow of execution which relates to determining that the value of another attribute for the event indicates that the event is to be published in the datastore 104. In contrast, circled reference "Y" is used to indicate a flow of execution which relates to determining that the value of another attribute for the event indicates that the event is to be published in the database 106. In either case, publication of the event is delayed responsive to determining that the value of the attribute for the event indicates that publishing of the event is to be delayed. In different implementations, delaying the publication of the event occurs in different ways (e.g., the event may be stored in a buffer until the transaction is committed or rolled back; the event may be inserted in the database in the same transaction; etc.).

As mentioned, with reference to circled reference "X," flow passes from block 108 to block 112. In block 112, the event is stored in a buffer as a buffered event. A "buffer" is a store of data that is intended to store data temporarily; e.g., a data structure in volatile memory. Storing the event in a buffer facilitates delaying publication of the event (e.g., until the transaction is committed). From block 112, flow passes to block 116.

Block 116 includes determining whether the transaction has been rolled back or committed. Ways of determining that a transaction has been rolled back or committed are described further with reference to FIGS. 1B and 1C. Responsive to determining that the transaction has been committed, flow passes to block 118, in which the buffered event is published to a datastore. In some implementations, the datastore is different from the database on which the transaction is performed. Optionally, flow passes from block 118 to block 120 and the buffered event is discarded (i.e., removed from the buffer) after the buffered event is stored in the datastore. Returning to block 116, responsive to determining that the transaction has been rolled back, flow passes to block 122 and the buffered event is discarded. Discarding rather than publishing the buffered event avoids it reflecting an operation on the database that was not performed.

Buffering the event and publishing or discarding it responsive to the transaction being committed or rolled back provides advantages over always publishing the event regardless of whether the transaction is rolled back or committed. In some exemplary scenarios, publishing an event may cause consumers and downstream applications associated with them to react to the event's publication. For example, a modification to a document may cause an event to be published. Responsive to receiving the event, a consumer may cause a downstream application to automatically generate and send an email to a designated recipient list regarding the document's modification. If the modification is rolled back, the automatic generating and sending the email is rendered spurious, causing waste. Thus, buffering an event and publishing or discarding it responsive to the transaction being respectively committed or rolled back may save computing resources, as well as other tangible and intangible costs, for example.

Returning to block 108 and with reference to circled reference "X," flow passes to block 128 responsive to determining that the value of the attribute indicates that publishing the event is not to be delayed 126. Block 128 includes publishing the event to the datastore regardless of whether the transaction is rolled back or committed. In some scenarios this behavior may be preferred to delaying publication. For example, an event may be published for logging purposes regardless of whether the transaction is rolled back or committed; in such an example, the fact that one or more records of the database were attempted to be updated, deleted, or inserted may be useful. In some implementations, publishing an event regardless of whether the transaction is rolled back or committed may be akin to publishing the event immediately. Publishing without delay (e.g., immediately) can be beneficial. For example, some systems may have a low incidence of transactions being rolled back and high rate of publishing events responsive to operations on a database. In such systems, publishing events without delay may avoid bottlenecks in transmitting events to consumers and consumers processing them with limited risk of events reflecting operations that were not performed on the database.

Returning to block 108 and with reference to circled reference "Y," flow passes to block 130 responsive to determining that the value of the attribute indicates that publishing the event is not to be delayed 126. Block 130 includes storing the event in the database regardless of whether the transaction is rolled back or committed.

Responsive to determining that the value indicates that publishing the event is to be delayed 110, flow passes to block 124. In block 124, an operation for storing the event in the database is included in the transaction (i.e., the transaction responsive to which the user configured an event to be published). Including an operation for storing the event in the database as part of the same transaction effectively delays publication of the event until the transaction is committed, and effectively rolls back publication of the event if the transaction is rolled back. Thus, storing the event in the database as part of the same transaction (e.g., by including in the transaction an operation for storing the event in the database) effectively expands the boundary of the transaction to include the publishing of the event. Using the transaction of the database to selectively publish the event makes use of the database's existing functionality and avoids delays in publishing the event when the transaction is committed (e.g., because the database need not be monitored to determine that the transaction has been committed).

In some implementations, an operation for storing the event in the database includes one or more insertions, deletions, updates, or like operations which, when performed, result in data corresponding to the event being included in the database. An operation for storing an event in a database is thus operable to cause the event to be stored in the database. In some implementations, an operation for storing the event in the database involves inserting one or more records in the database for the event. Additionally or alternatively, an operation for storing the event may include updating one or more records in the database (e.g., if the database already includes one or more records for the event). Implementations may include such operations in a transaction in different ways, as discussed referring to FIGS. 1B and 1C.

FIG. 1A shows exemplary operations for selectively publishing an event configured by a user to be published responsive to one or more records of a database being updated, deleted, or inserted in a transaction. Implementations need not implement all of the blocks shown in FIG. 1A to realize some of the advantages described herein. For example, in implementations which only support a database and not a datastore, blocks 102, 112, 114, 116, 118, 120, 122, and 128 need not be implemented. Conversely, in implementations which only support a datastore and not storing an event in a database, blocks 102, 124, and 130 need not be implemented.

Some implementations include all of the blocks shown in FIG. 1A, allowing alternative operations for delaying the publishing of an event depending on where the event is to be published. As described above, in these implementations, the determination of which of the database or the datastore is to be used for publishing the event depends on the value of the another attribute for the event. While the implementations herein describe two options for publishing the event (i.e., database and datastore), in other implementations, different options for publishing the event can be supported. For example, other implementations can support the event being published in one of several different datastores (which may include databases or other types of datastores). In these implementations, the operations of FIG. 1A can be extended such that the another attribute indicates which of the several datastores is to be used for publishing the event and the blocks associated with circular reference "X" described above can be performed for each one of these additional datastores (and/or the blocks associated with circular reference "Y" can be performed for those of the datastores that are databases). Implementations may also support publishing the event to multiple of several different datastores; in such implementations, the operations described in block 100 can be performed for each of the multiple datastores.

Figure 1B:
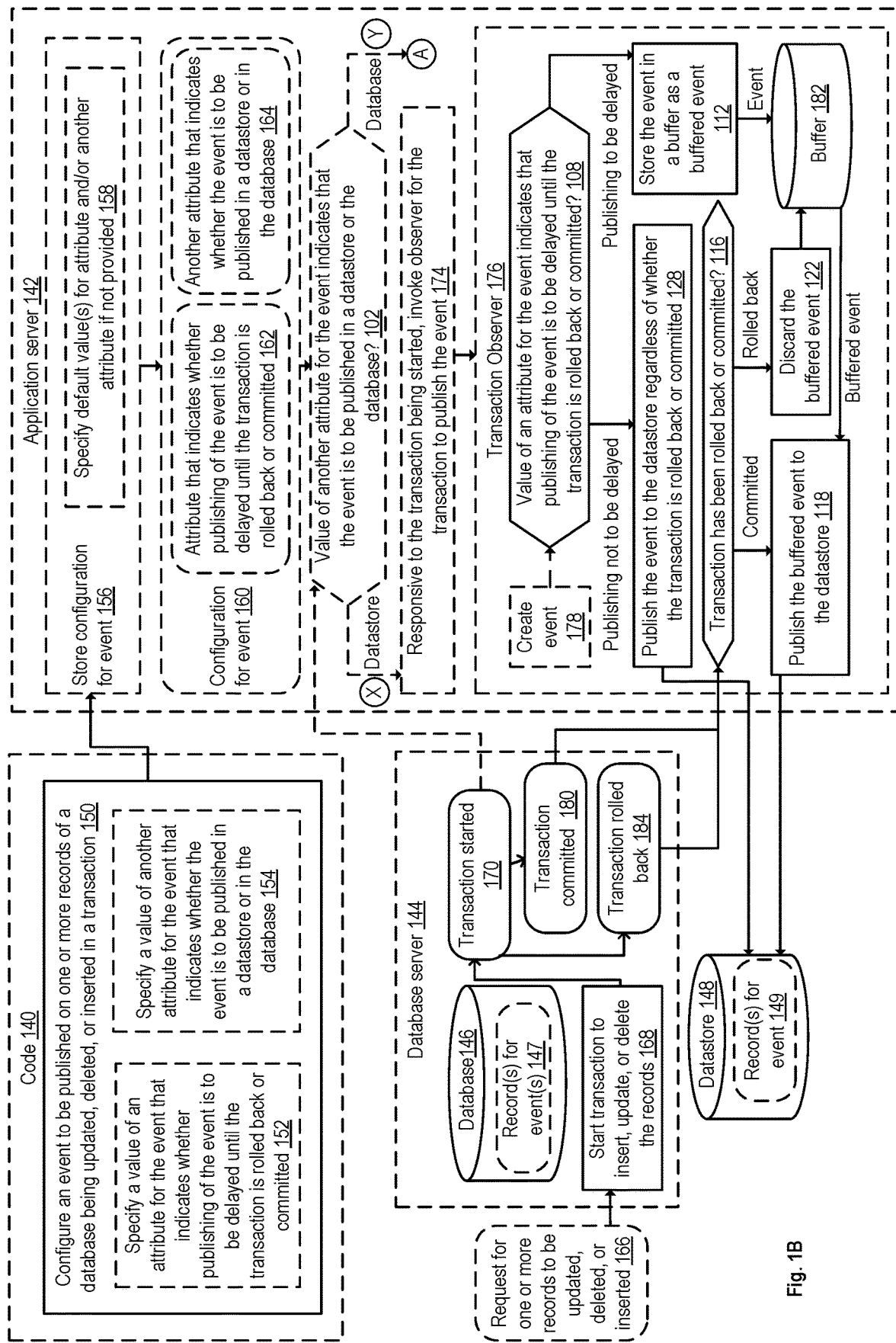
FIG. 1B is a block diagram showing a system for selectively publishing an event in a datastore, according to some example implementations.

FIG. 1B is a block diagram showing a system for selectively publishing an event in a datastore, according to some example implementations. Specifically, FIG. 1B shows code 140, application server 142, database server 144, and datastore 148. In the exemplary implementation shown in FIG. 1B, an event that results from one or more records being updated, deleted or inserted in the database 144 is published in the datastore 148. Publishing the event to datastore 148 may provide advantages such as separating data storage concerns; i.e., when the datastore stores events, then the events are stored separately from the records in the database. Further, in some implementations, the datastore can be of a different type than a database. Using a different type of datastore can enable different treatment of events. For example, a datastore might be a streaming platform and publishing an event to it results in streaming the event; a datastore might be a message queue and publishing an event to it results in the event being placed in a queue. Thus, supporting one or more different types of datastores can facilitate application infrastructures that rely on particular features of those types of datastores (or instances thereof). For example, the use of a datastore (e.g., datastore 148) that is separate from a database may facilitate the publication of events at volume or/at speed that may be less feasible if a database is used.

Code 140 includes block 150, which includes configuring an event to be published on one or more records of a database being updated, deleted, or inserted in a transaction. Block 150 optionally includes one or both of blocks 152 and 154. Configuring an event may include selecting one or more fields for the event, values therefor, and/or conditions for publishing the event. For example, when the event relates to an insertion of a record in a database, the fields of the event may include a type of the record, an identifier of the record, an indication of the type of operation performed on the record (i.e., an insertion), etc. In block 152, a value of an attribute is specified for the event. The value of the attribute indicates whether publishing of the event is to be delayed until the transaction is rolled back or committed. In block 154, a value of another attribute for the event is specified. The value of the another attribute indicates whether the event is to be published in a datastore or in the database. In some implementations, one or both of the value of the attribute and the value for the another attribute for the event are configurable. In some implementations, the value of the attribute or the value of the another attribute may be configured by a user who is performing one or both of blocks 152 and 154. In some implementations, the value of the attributed and/or the value of the another attribute can be configured through code performing one or both of blocks 152 and 154. Other implementations for configuring the value of the attribute and/or the value of the another attribute can be contemplated without departing from the scope of the implementations described herein. Code 140 may include or be included in other portions of code not shown in FIG. 1B. For example, code 140 may be part of code of a graphical user interface through which a user can configure the event to be published.

Responsive to execution of block 150, flow passes to block 156 included in the application server 142 (in some implementations (not shown), code 140 may be included in application server 142). In block 156, a configuration for the event is stored (e.g., configuration for event 160). In some implementations, such a configuration may be stored in a database (e.g., in database 146 or another database); additionally or alternatively, the configuration may be stored in a component which provides for faster read access (e.g., a cache or another type of datastore).

Implementations may include specifying, at block 158, one or more default values for the attribute and/or the another attribute if not provided when the event is configured at block 150. A default value for the attribute or for the another attribute is a preselected value that is to be used for the attribute or the another attribute if no value is explicitly set (e.g., by a user configuring the value) at block 152 or block 154. For example, implementations may not need that a user configures an attribute that indicates whether publishing of the event is to be delayed until the transaction is rolled back or committed 162, and/or configures another attribute that indicates whether the event is to be published in a datastore or in the database 164. In such implementations, a default value can be specified for the attribute and/or the another attribute for the event. In some implementations, a default value that indicates that publishing of the event is not to be delayed can be selected to be applied to the attribute of each event when a value was not specified at block 152 for that event. In alternative implementations, a default value that indicates that publishing of the event is to be delayed can be selected to be applied to the attribute of each event when a value is not specified at block 152 for that event. In some implementations, a default value that indicates that the event is to be published in a datastore can be selected to be applied to the another attribute of an event when a value was not specified at block 154 for that event. In alternative implementations, a default value that indicates that the event is to be published in the database can be selected to be applied to the attribute of each event when a value is not specified at block 154 for that event. As one of skill in the art will recognize, selecting a default value to be applied to a given attribute of an event may be done programmatically and/or by a user.

Default values may be provided dynamically in some implementations. For example, a default value may be specified based on other attributes of the event (e.g., a topic with which an event is associated (a common characteristic of events may be referred to as a topic); an identifier of a publisher of the event; etc.). Thus, some advantages of the implementations described herein are not necessarily premised on the configurability of the attributes 162 and/or 164, although the configurability of one or both of the attribute and the another provides additional advantages. The configurability allows a user and/or a programmer to identify how an event is to be published (e.g., if the publishing of the event is to delayed or not to be delayed until a transaction is committed or rolled back) and where an event is to be published (e.g., to one or more datastore(s) and/or database(s)), thus providing options to the user and/or programmer. In some implementations, a user may specify one or more rules for specifying one or more default values for attributes 162 and/or 164. Specifying default values, regardless how it is achieved, may allow for consistent treatment of events (e.g., when a default value is specified), backwards compatibility when a system is modified according to an implementation described herein (e.g., a default value may provide for the previous behavior exhibited by the system), and/or a fallback if an event is configured in block 150 and one or both of blocks 152 and 154 are not executed, etc.

Given a configuration for an event (such as configuration for event 160), application server 142 can selectively publish the event configured by a user to be published responsive to one or more records of a database being updated, deleted, or inserted in a transaction, which can be configured in various ways. For example, a user may configure a trigger on database 146 such that the trigger publishes an event on records being updated, deleted, or inserted in a transaction (or as previously described, in the context of other operations on the database). Additionally or alternatively, a trigger may be created by an application, through user interaction with the application or otherwise. An application may configure an event to be published based on application-specific behavior (e.g., a shared document being modified, modification of a shared document being completed, etc.).

Responsive to a request for one or more records to be inserted, updated, or deleted 166, database server 144 starts a transaction to insert, update, or delete the records 168. As known to one of skill in the art, a transaction can be started in various ways (e.g., via a command, automatically based on a configuration of the database, responsive to a call to an application programming interface (API), etc.). As indicated by the arrow from block 168 to 170, starting the transaction in block 168 results in a state of transaction started 170.

Responsive to the state change to transaction started 170, one or more operations can be performed in the application server 142. The operations can be performed through code that is executed in application server 142. This execution can be the result of 1) application server 142 (or another component) monitoring the database server 144 and/or database 146 to detect when the transaction is started and executing the code after detecting that the transaction is started; and/or 2) database server 144 indicating that the transaction is started (e.g., by calling code in application server 142 (e.g., via a callback, via a trigger, etc.)). By way of example and not limitation, some programming frameworks may provide for code to be executed on detecting the start of a transaction (e.g., in relation to a specified database object) or on detecting the roll back or commit of a transaction, such as the Spring Framework, the Java Persistence API, etc.

The operations in application server 142 include block 102. In some implementations, the code executing in application server 142 is a generic callback function (not shown) that can, for example, call block 102 and optionally perform other operations (e.g., obtain one or more configurations for events to be published, such as configuration for event 160). Block 102 includes determining a value of another attribute for the event indicates that the event is to be published in a datastore or the database (e.g., rather than the datastore). If the value indicates that the event is to be published in a datastore, flow passes to block 174, indicated with a circled reference "X." If the value indicates that the event is to be published in the database, flow passes to block 186 (shown in FIG. 1C) indicated with a circled reference "Y" and via circled reference "A." Circled references "X" and "Y" correspond to the flow of execution in FIG. 1A. In implementations which only support one of a database and a datastore, and/or where the event lacks the another attribute that indicates whether the event is to be published in a datastore or in the database, when the state of the transaction changes to transaction started 170, block 102 is not performed and the application server performs block 174.

In some implementations, responsive to the transaction being started, an observer is invoked for the transaction to publish an event 174. An observer (also known as a transaction observer when the observer observes a transaction) is a component which is associated with a transaction and which can respond to a change in state of a transaction (e.g., one or more of transaction started 170, transaction committed 180, transaction rolled back 184, etc.). In some implementations, to be invoked, a transaction observer is selected (e.g., by the generic callback function) based on one or more of a transaction being started, the nature of the transaction (e.g., whether the transaction includes one or more records being inserted, updated, or deleted, a database object being created or dropped, access privileges being granted or revoked, etc.), and/or the one or more configurations for events to be published. For example, in some implementations, a transaction observer is created based on the value of another attribute for the event indicating that the event is to be published in a datastore but not created if the value of the another attribute indicates that the event is to be published in a database. Other implementations are possible (e.g., a transaction observer could be invoked based on the value indicating that the event is to be published in a database (not shown in FIG. 1C)). As one of skill in the art will recognize, transaction observer 176 is exemplary and not limiting. Implementations can use or not use a transaction observer to implement the blocks shown in transaction observer 176 (e.g., database server 144 can be configured with one or more database triggers to call block 116 responsive to a change in state of the transaction; the generic callback function can call block 116 responsive to a change in state of the transaction, etc.).

From block 174, flow passes to the transaction observer 176 in some implementations, and optional block 178 is executed. In block 178, an event is created. The event corresponds to the configuration for event 160. Alternatively, a corresponding event may have already been created (e.g., in the generic callback function (not shown)) and need not be created in block 178. Creating an event may include instantiating an object and setting values for one or more attributes of the object according to a configuration for the event.

In some implementations, flow passes from block 178 to block 108. Blocks 108, 112, 128, 116, 118, and 122 have been described referring to FIG. 1A. Transaction observer 176 also includes buffer 182. In block 112, the event is stored in the buffer as a buffered event (indicated by the arrow from block 112 to buffer 182). If the buffered event is published to the datastore 148, the buffered event is retrieved from buffer 182 (indicated by the arrow from buffer 182 to block 118). In some implementations, the buffered event is discarded after it is stored in the datastore (as shown in block 120 in FIG. 1A). Discarding the buffered event 122 includes removing it from buffer 182 (indicated by the arrow between block 122 and buffer 182). Although FIG. 176 shows buffer 182 included in transaction observer 176, buffer 182 may be included in another component in other implementations (e.g., buffer 182 may be shared amongst multiple transaction observers or amongst multiple application servers). Additionally or alternatively, buffer 182 can be substituted with a store of data that is intended to store data for a longer period of time than a buffer (e.g., the event may be stored in a cache and marked to indicate that the event has not been published); this may offer different advantages in other application infrastructures (e.g., the cache may be used as another source of events subject to cached events being marked to indicate that they have not been published). Using a buffer provides its own advantages, including that events can be stored temporarily until the transaction is rolled back or committed; discarding buffered events also helps reduce minimize the memory used in temporarily storing events.

From the state of transaction started 170, the transaction may be committed (and the state of the transaction changes to transaction committed 180) or rolled back (and the state of the transaction changes to transaction rolled back 184). Block 116 is executed responsive to a state change to transaction committed 180 or transaction rolled back 184. Alternatively, implementations may include that block 118 is executed responsive to a state change to transaction committed 180, or that block 122 is executed responsive to a state change to transaction rolled back 184. Additionally or alternatively, a generic callback function (of the transaction observer 176, of the application server 142, etc.) may call either block 116 responsive to a state change, or a respective one of blocks 118 and 122 responsive to a state change to transaction committed 180 or transaction rolled back 184.

In implementations shown in FIG. 1B, responsive to determining that the transaction has been committed, block 118 is executed and the buffered event published to the datastore 148 (e.g., in or as the record(s) for event 149). In contrast, when in block 108 the value of the attribute for the event indicates that publishing of the event is not to be delayed, block 128 is executed and the event published to the datastore regardless of whether the transaction is rolled back or committed. Thus, implementations shown in FIG. 1B provide for selectively publishing the event to the datastore 148.

Figure 1C:
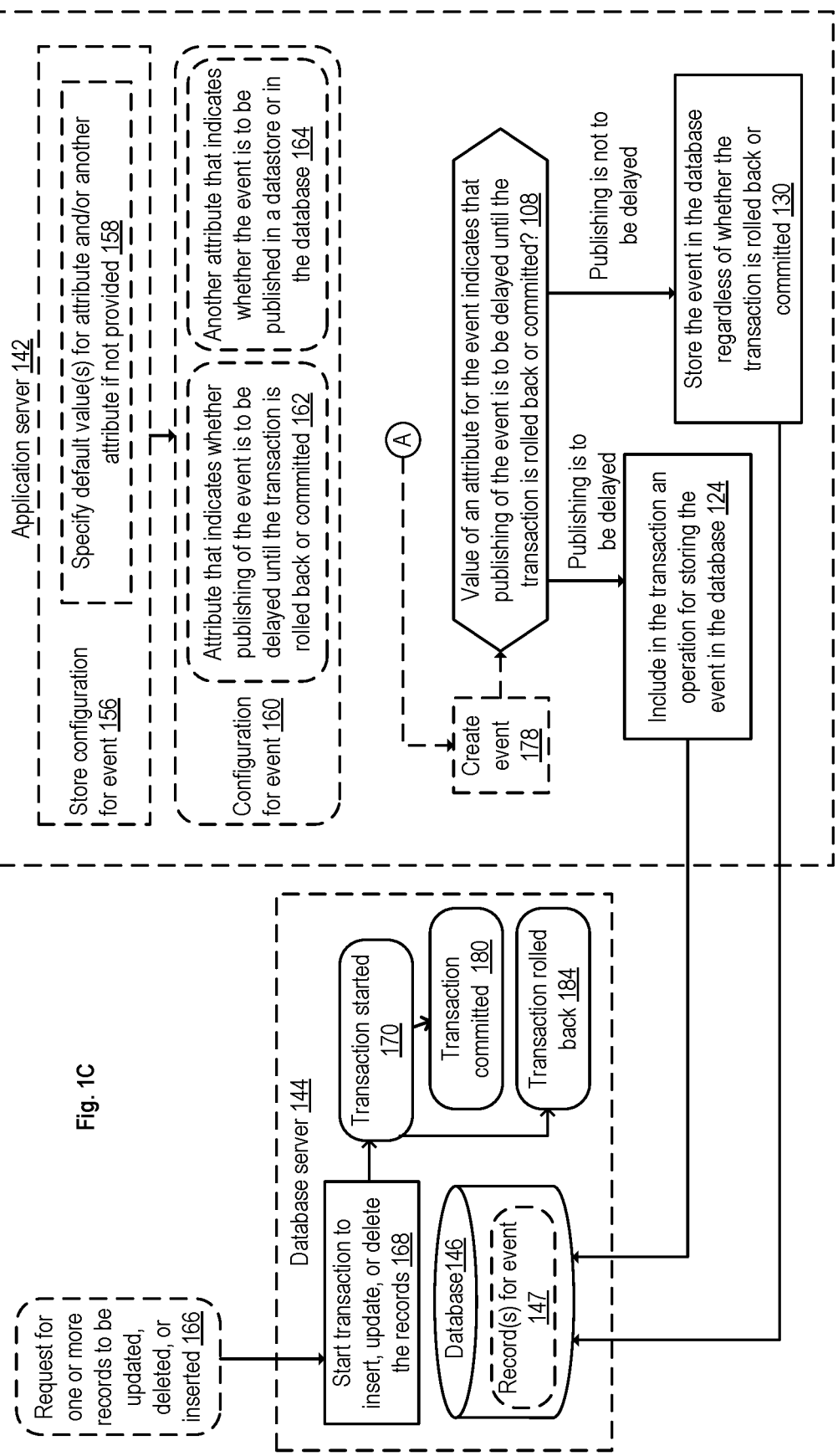
FIG. 1C is a block diagram showing a system for selectively publishing an event in a database, according to some example implementations.

FIG. 1C is a block diagram showing a system for selectively publishing an event in a database, according to some example implementations. Publishing an event in a database may simplify application infrastructure if a datastore is not needed. FIG. 1C illustrates the database server 144 and the application server 142 previously discussed with reference to FIG. 1B. In some implementations, the database server 144 and the application server 142 are capable of performing operations described with reference to FIG. 1B and operations described with reference to FIG. 1C. In some implementations, the database server 144 and the application server 142 are capable of performing only operations described with reference to FIG. 1A. For example, in some implementations, when all events that result from a transaction being executed in the database server 144 are automatically stored in the datastore 148, the operations 102, 178, 124, and 130 may not be performed. In other implementations, the database server 144 and the application server 142 are capable of performing only operations described with reference to FIG. 1C. For example, in implementations which only support a database and not a datastore, blocks 102, 112, 114, 116, 118, 120, 122, and 128 (shown in FIG. 1B) need not be implemented as mentioned. Although FIG. 1C shows selectively publishing an event in the database 146 (i.e., the database which receives the request for one or more records to be updated, deleted, or inserted 166), implementations may selectively publish an event in a different database from database 146.

Request 166, database server 144 and its elements, blocks 156, 158, and configuration for event 160 and its elements have been discussed referring to FIG. 1B. From block 102 (shown in FIG. 1B and FIG. 1A), flow passes (via circled reference "A") to optional block 178 responsive to determining that the value of another attribute for the event indicates that the event is to be published in a database. Block 178 was described referring to FIG. 1B. In FIG. 1C however, block 178 is not shown as included in a transaction observer. As mentioned, implementations can use or not use a transaction observer. Implementations need not use a transaction observer when the event is to be published in database 146 as later explained.

From block 178, flow passes to block 108 which includes determining whether a value of an attribute for the event indicates that publishing of the event is to be delayed until the transaction is rolled back or committed. Responsive to determining that publishing of the event is to be delayed, flow passes to block 124; while responsive to determining that publishing of the event is not to be delayed, flow passes to block 130.

In block 124, an operation for storing the event in the database (e.g., in or as record(s) for event 147) is included in the transaction (i.e., the transaction started in block 168). This can be done in various ways in different implementations. Some implementations may include obtaining a handle for the transaction (e.g., via an API call) and inserting the event in that transaction (e.g., via another API call). Other implementations may issue a request on database 146 to insert the event in the transaction. Publishing the event to the database 146 in the transaction started in block 168 allows that 1) the event is stored (e.g., inserted) in and committed to the database 146 if the transaction is committed; and 2) the event is not stored in the database 146 if the transaction is rolled back. Where publishing of the event is to be delayed and the event is to be stored in a different database, implementations may need to use a mechanism such as described in relation to FIG. 1B (i.e., using a buffer to store the event, and then publishing the buffered event to the different database responsive to the transaction being committed or discarding the buffered event responsive to the transaction being rolled back).

In contrast, in block 130, the event is stored in the database (e.g., in or as record(s) for event 147) regardless of whether the transaction is rolled back or committed. Where publishing of the event is not to be delayed and the event is to be stored in a different database, block 130 can be implemented to store the event in the different database regardless of whether the transaction is rolled back or committed. As known to those of skill in the art, implementations may allow for a choice of database (e.g., the same database and/or a different database) to which the event is published. For example, implementations may allow the choice of database to be included in a configuration file that is loaded by application server 142 and one or more implementations of block 124 and block 130 to be selected based on that choice. As another example, implementations may allow the choice of database to be indicated in an attribute of an event (e.g., via a configuration for an event that includes such an attribute). More generally, implementations may allow a choice of datastore in similar fashion(s).

Figure 2A:
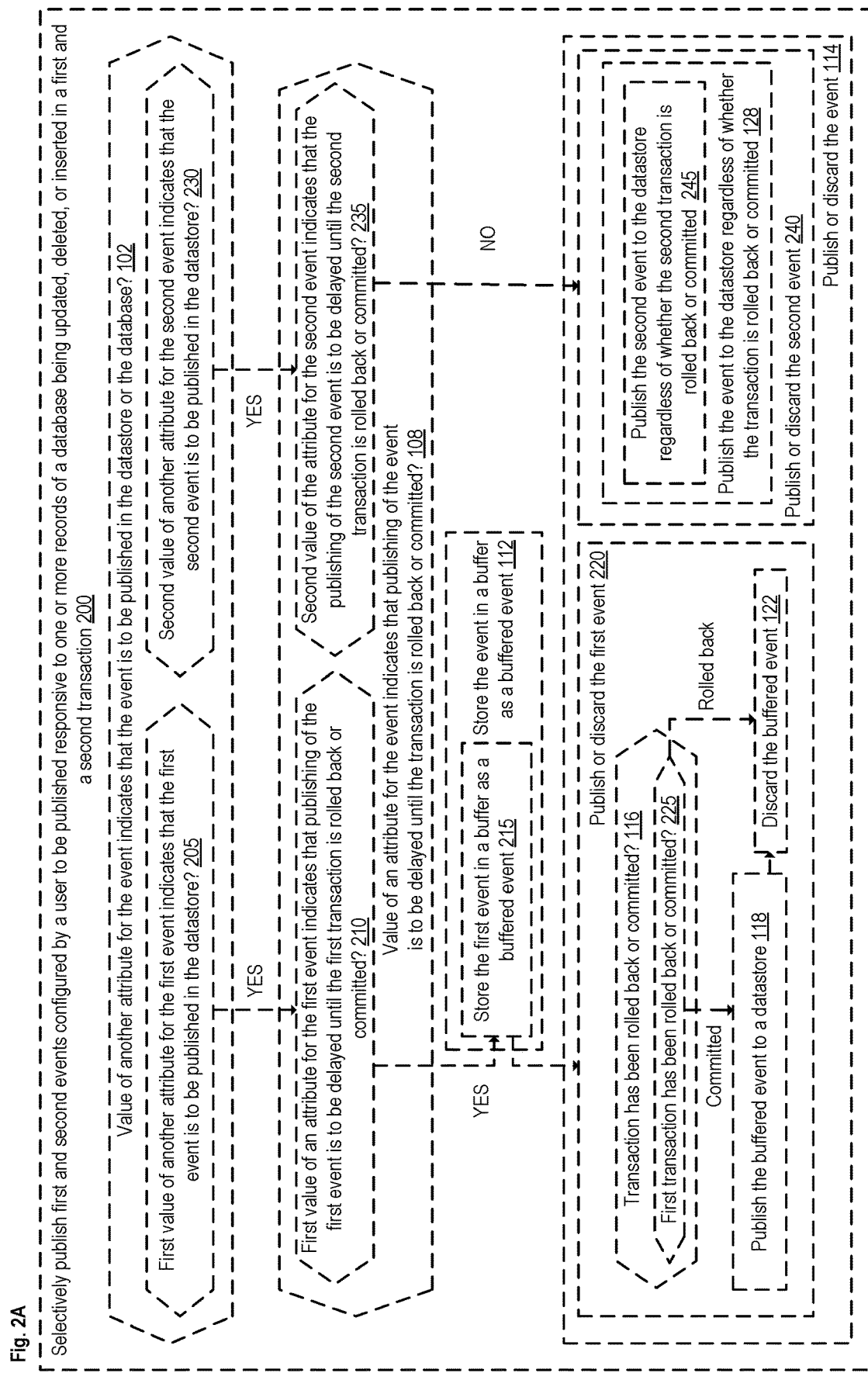
FIG. 2A is a more detailed flow diagram showing operations for selectively publishing events in a datastore, according to some example implementations.

FIG. 2A is a more detailed flow diagram showing operations for selectively publishing events in a datastore, according to some example implementations. Block 200 includes selectively publishing first and second events configured by a user to be published responsive to one or more records of a database being updated, deleted, or inserted in a first and a second transaction. In different implementations, the first and second transactions are one transaction or separate transactions. In either case, as an alternative to implementations shown in FIG. 2A, implementations shown in FIG. 1A may be executed sequentially or in parallel for each of the first and second events.

Additionally or alternatively in some implementations, blocks may be implemented to treat more than one event in one execution of a block. For example, in some implementations, block 205 and block 230 may be combined such that in one execution of the combined block includes determining whether 1) a first value of another attribute for the first event indicates that the first event is to be published in the datastore; and 2) a second value of another attribute for the second event indicates that the second event is to be published in the datastore. For another example, block 118 and/or block 245 may be implemented to respectively publish multiple buffered events or events to a datastore. Combining blocks in this manner may provide advantages (e.g., reducing the overhead of calling a function if a block is implemented as a function; performing input-output operations in bulk for multiple events and thus reducing network overhead, etc.).

Returning to FIG. 2A, block 102 has been described; as shown in FIG. 2A, block 102 may include optional blocks 205 and 230. Block 205 includes determining whether a first value of another attribute for the first event indicates that the first event is to be published in the datastore. Block 230 includes determining whether a second value of another attribute for the second event indicates that the second event is to be published in the datastore.

From block 205 and block 230, flow respectively passes to block 210 and block 235, in each case responsive to determining respectively that the first value and the second value indicate that the first and second events are to be published in the datastore. Block 210 includes determining whether a first value of an attribute for the first event indicates that publishing of the first event is to be delayed until the first transaction is rolled back or committed. Block 235 includes determining whether a second value of an attribute for the second event indicates that publishing of the second event is to be delayed until the second transaction is rolled back or committed.

Responsive to determining that the first value of an attribute for the first event indicates that publishing of the first event is to be delayed, flow passes to block 215. In block 215, the first event is stored in a buffer as a buffered event. From block 215, flow passes to block 220.

Block 220 includes blocks 118 and 122 which have been described (e.g., in relation to FIG. 1A). Block 220 also includes block 116, which optionally includes block 225. Block 225 includes determining whether the first transaction has been rolled back or committed; responsive to determining that the first transaction has been rolled back, flow passes to block 122. Responsive to determining that the first transaction has been committed, flow passes to block 118. Optionally after execution of block 118 wherein the buffered event is published to a datastore, flow passes to block 122 and the buffered event is discarded.

Returning to block 235, responsive to determining that the second value of the attribute for the second event indicates that the publishing of the second event is not to be delayed, flow passes to block 240. Block 240 optionally includes block 245. In block 245, the second event is published to the datastore regardless of whether the second transaction is rolled back or committed.

Figure 2B:
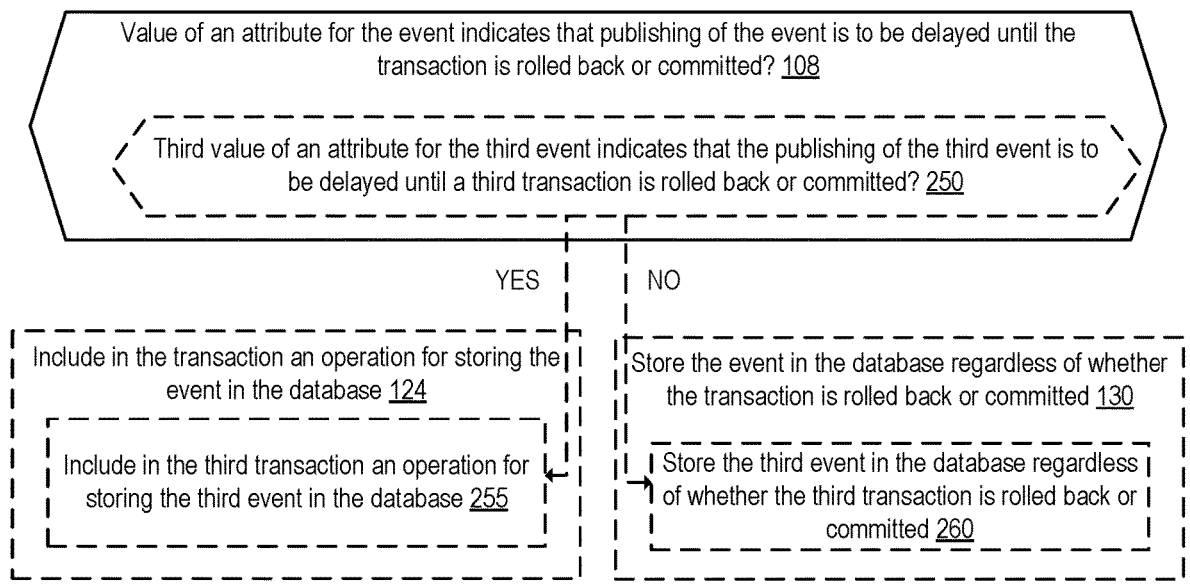
FIG. 2B is a more detailed flow diagram showing operations for selectively publishing events in a database, according to some example implementations.

FIG. 2B is a more detailed flow diagram showing operations for selectively publishing events in a database, according to some example implementations. Optionally included in block 108 (described referring to FIG. 1A) is block 250. Block 250 includes determining whether a third value of an attribute for the third event indicates that the publishing of the third event is to be delayed until a third transaction is rolled back or committed. In implementations which include one or both of the first and second transactions of FIG. 2A, one or more of the first, second, and third transaction may be one or more transactions.

From block 250, flow passes to block 255 responsive to determining that the third value of an attribute for the third event indicates that the publishing of the third event is to be delayed. In block 255, an operation for storing the third event in the database is included in the third transaction.

Alternatively, from block 250, flow passes to block 260 responsive to determining that the third value of an attribute for the third event indicates that the publishing of the third event is not to be delayed. In block 260, the third event is stored in the database regardless of whether the third transaction is rolled back or committed.

Several implementations for selective publishing of events have been described herein. Implementations described herein provide advantages compared to existing event publication mechanisms because implementations allow for selectively publishing an event rather than always publishing an event regardless of whether a transaction that is associated with the event is rolled back or committed. For example, publishing an event 1) may or may not be delayed until the transaction is rolled back or committed; and/or 2) an event may be published to a datastore or in the database. Some implementations described herein allow the publication of an event that relates to an operation in a transaction to adapt to the outcome of the transaction (e.g., that the transaction is committed or rolled back). In these implementations, the event is published (i.e., made available to potential consumers) only when the transaction is committed and not published when the transaction is rolled back. These implementations provide better reliability and coherence between the operations that are committed in the database and the events recorded in response to those operations. In other implementations, the event is published regardless of whether the transaction is committed or rolled back. These implementations provide a consumer with faster access to events and enables it to learn of operations performed in a database regardless of whether the operation is committed or rolled back.

Implementations described herein also provide an advantage because they provide for selectively publishing an event in a configurable way. For example, a user may configure an event 1) with an attribute that indicates that publishing the event is to be delayed (or not); and/or 2) with another attribute that indicates that the event is to be published in a datastore or in a database. Thus, implementations described herein not only allow for a user to configure an event, but also for a configurable and therefore more flexible system which can, for example, publish an event selectively based on one or more attributes of the event.

Example Electronic Devices and Environments
Exemplary Databases

Databases may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store (also known as document-oriented as they store document-oriented information, which is also known as semi-structured data). A database may comprise one or more database objects that are managed by a database management system (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In an RDBMS, each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the record belongs; e.g., a customer-relationship management (CRM) database may include a table that describes a customer with fields for contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
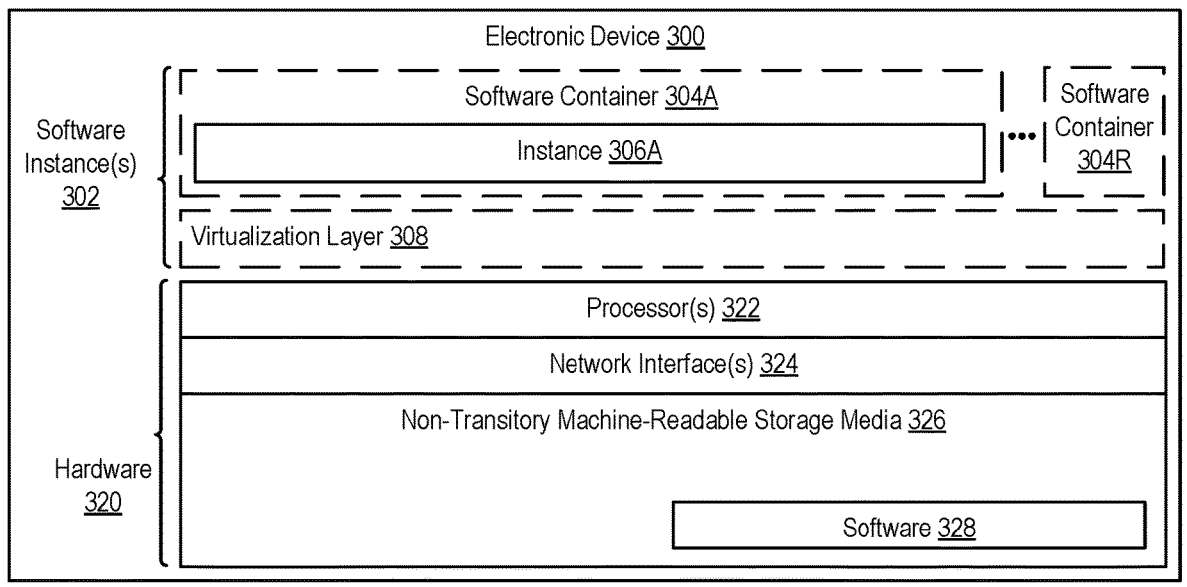
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). One or more implementations described herein may be implemented as a service (e.g., an event publishing service). Each of the previously database, datastore and the application server may be implemented in one or more electronic devices 300. In one implementation, the application server can be part of an event publishing platform that offers an event publishing service. In some implementations, the event publishing platform may include the database 146 and the datastore 148. In other implementations, one or both of the database 146 and the datastore 148 are implemented as separate services to the event publishing platform. In one implementation the event publishing service can be available to one or more clients (such as consumers). In one implementation: 1) each of the clients is implemented in a separate one of the electronic devices 300 (e.g., in end user devices where the software 328 represents the software to implement clients to interface directly and/or indirectly with the event publishing service (e.g., software 328 represents a web browser, a native client, a portal, a command-line interface, and/or an API based upon protocols such as Simple Object Access Protocol (SOAP), REpresentational State Transfer (REST), etc.)); 2) the event publishing service is implemented in a separate set of one or more of the electronic devices 300 (e.g., a set of one or more server devices where the software 328 represents the software to implement the event publishing service); and 3) in operation, the electronic devices implementing the clients and the event publishing service would be communicatively coupled (e.g., by a network) and would establish between them (or through one or more other layers and/or other services) connections for submitting data to configure an event to be published (such as described in block 150) to the event publishing service. Other configurations of electronic devices may be used in other implementations (e.g., an implementation in which the client and the event publishing service are implemented on a single electronic device 300).

During operation an instance of the software 328 (illustrated as instance 306A and also referred to as a software instance; and in the more specific case of an application, as an application instance) is executed. In electronic devices that use compute virtualization, the set of one or more processor(s) 322 typically execute software to instantiate a virtualization layer 308 and software container(s) 304A-R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 328 is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Example Environment

Figure 3B:
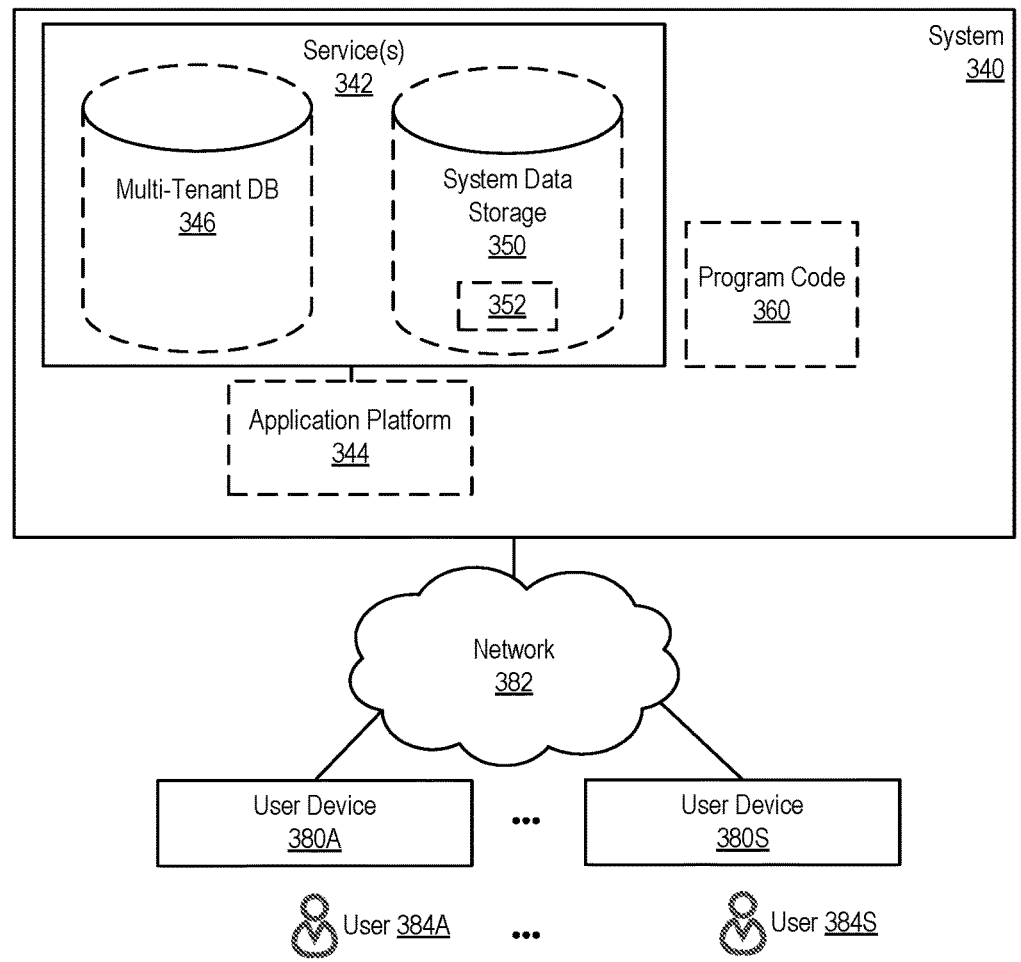
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including the event publishing service. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third party datacenter(s), which are datacenter(s) owned and/or operated by one or more different entities than the entity that provides the service(s) 342 (e.g., the different entities may host some or all of the software provided and/or operated by the entity that provides the service(s) 342). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380A-S over a network 382. The service(s) 342 may be on-demand services that are made available to one or more of the users 384A-S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-S). The service(s) 342 may communicate with each other and/or with one or more of the user devices 380A-S via one or more APIs (e.g., a REST API). The user devices 380A-S are operated by users 384A-S.

In some implementations the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a CRM system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following:

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning, the event publishing service |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the event publishing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an API based upon protocols such as SOAP, REST, etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," "some implementations," "other implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for selectively publishing first and second events configured by a user to be published responsive to one or more records of a database being updated, deleted, or inserted in a first and a second transaction, the method comprising:
   specifying one or more default values for attributes for the first or second event using one or more rules specified by the user;
   determining whether a first value of an attribute for the first event indicates that publishing of the first event is to be delayed until the first transaction is rolled back or committed;
   responsive to determining that the first value of the attribute for the first event indicates that the publishing of the first event is to be delayed until the first transaction is rolled back or committed, performing:
      responsive to a determination that a first value of another attribute for the first event indicates that the first event is to be published to the database,
         including an operation for storing the first event to be published to the database in the first transaction by inserting the first event in the first transaction, which causes publication of the first event to the database and rolling back of the first event publication as the first transaction is committed and rolled back, respectively,
      responsive to a determination that a second value of the another attribute for the first event indicates that the first event is to be published to a datastore that is different from the database,
         storing the first event in a buffer as a buffered event,
         determining whether the first transaction has been rolled back or committed,
         responsive to determining that the first transaction has been committed, publishing the buffered event to the datastore that is different from the database, and
         responsive to determining that the first transaction has been rolled back, discarding the buffered event;
   determining whether a second value of the attribute for the second event indicates that the publishing of the second event is to be delayed until the second transaction is rolled back or committed; and
   responsive to determining that the second value of the attribute for the second event indicates that the publishing of the second event is not to be delayed until the second transaction is rolled back or committed, publishing the second event to the datastore regardless of whether the second transaction is rolled back or committed.

2. The method of claim 1, wherein the determining whether the second value of the attribute for the second event indicates that publishing of the second event is to be delayed until the second transaction is rolled back or committed is performed responsive to determining that the second value of the another attribute for the second event indicates that the second event is to be published in the datastore.

3. The method of claim 2, further comprising:
determining whether the first value of another attribute for a third event indicates that the third event is to be published to the database rather than the datastore;
responsive to determining that the first value of the another attribute for the third event indicates that the third event is to be published to the database, performing:
determining whether a third value of an attribute for the third event indicates that the publishing of the third event is to be delayed until a third transaction is rolled back or committed;
responsive to determining that the third value of the attribute for the third event indicates that the publishing of the third event is to be delayed until the third transaction is rolled back or committed, including in the third transaction an operation for storing the third event in the database; and
responsive to determining that the third value of the attribute for the third event indicates that the publishing of the third event is not to be delayed until the third transaction is rolled back or committed, storing the third event in the database regardless of whether the third transaction is rolled back or committed.

4. The method of claim 2, wherein the first value of the another attribute for the first event and the second value of the another attribute for the second event are configurable by a user.

5. The method of claim 4, wherein the first value of the another attribute for the first event and the second value of the another attribute for the second event are default values.

6. The method of claim 1, wherein the first value of the attribute for the first event is configured by a user.

7. The method of claim 1, wherein the first value of the attribute for the first event is a default value.

8. The method of claim 1, further comprising:
responsive to the first transaction being committed, discarding the buffered event after the buffered event is stored in the datastore.

9. The method of claim 1, wherein the first and second transactions are separate transactions.

10. The method of claim 1, wherein the first event is associated with a topic and the publishing the buffered event to the datastore causes the first event to be transmitted to one or more consumers that have subscribed to the topic.

11. A non-transitory machine-readable storage medium that provides instructions that, when executed by a processor, are capable of causing said processor to perform operations for selectively publishing first and second events configured by a user to be published responsive to one or more records of a database being updated, deleted, or inserted in a first and a second transaction, the operations comprising:
specifying one or more default values for attributes for the first or second event using one or more rules specified by the user;
determining whether a first value of an attribute for the first event indicates that publishing of the first event is to be delayed until the first transaction is rolled back or committed;
responsive to determining that the first value of the attribute for the first event indicates that the publishing of the first event is to be delayed until the first transaction is rolled back or committed, performing:
responsive to a determination that a first value of another attribute for the first event indicates that the first event is to be published to the database,
including an operation for storing the first event to be published to the database in the first transaction by inserting the first event in the first transaction, which causes publication of the first event to the database and rolling back of the first event publication as the first transaction is committed and rolled back, respectively,
responsive to a determination that a second value of the another attribute for the first event indicates that the first event is to be published to a datastore that is different from the database,
storing the first event in a buffer as a buffered event,
determining whether the first transaction has been rolled back or committed,
responsive to determining that the first transaction has been committed, publishing the buffered event to the datastore that is different from the database, and
responsive to determining that the first transaction has been rolled back, discarding the buffered event;
determining whether a second value of the attribute for the second event indicates that the publishing of the second event is to be delayed until the second transaction is rolled back or committed; and
responsive to determining that the second value of the attribute for the second event indicates that the publishing of the second event is not to be delayed until the second transaction is rolled back or committed, publishing the second event to the datastore regardless of whether the second transaction is rolled back or committed.

12. The non-transitory machine-readable storage medium of claim 11, wherein the determining whether the second value of the attribute for the second event indicates that publishing of the second event is to be delayed until the second transaction is rolled back or committed is performed responsive to determining that the second value of the another attribute for the second event indicates that the second event is to be published in the datastore.

13. The non-transitory machine-readable storage medium of claim 12, that further provides instructions that, when executed by the processor, are capable of causing said processor to perform further operations comprising:
determining whether the first value of another attribute for a third event indicates that the third event is to be published to the database rather than the datastore;
responsive to determining that the first value of the another attribute for the third event indicates that the third event is to be published to the database, performing:
determining whether a third value of an attribute for the third event indicates that the publishing of the third event is to be delayed until a third transaction is rolled back or committed;

responsive to determining that the third value of the attribute for the third event indicates that the publishing of the third event is to be delayed until the third transaction is rolled back or committed, including in the third transaction an operation for storing the third event in the database; and responsive to determining that the third value of the attribute for the third event indicates that the publishing of the third event is not to be delayed until the third transaction is rolled back or committed, storing the third event in the database regardless of whether the third transaction is rolled back or committed.

14. The non-transitory machine-readable storage medium of claim 12, wherein the first value of the another attribute for the first event and the second value of the another attribute for the second event are configurable by a user.

15. The non-transitory machine-readable storage medium of claim 14, wherein the first value of the another attribute for the first event and the second value of the another attribute for the second event are default values.

16. The non-transitory machine-readable storage medium of claim 11, wherein the first value of the attribute for the first event is configured by a user.

17. The non-transitory machine-readable storage medium of claim 11, wherein the first value of the attribute for the first event is a default value.

18. The non-transitory machine-readable storage medium of claim 11, that further provides instructions that, when executed by the processor, are capable of causing said processor to perform further operations comprising:

responsive to the first transaction being committed, discarding the buffered event after the buffered event is stored in the datastore.

19. The non-transitory machine-readable storage medium of claim 11, wherein the first and second transactions are separate transactions.

20. The non-transitory machine-readable storage medium of claim 11, wherein the first event is associated with a topic and the publishing the buffered event to the datastore causes the first event to be transmitted to one or more consumers that have subscribed to the topic.

* * * * *